United States Patent [19]

Leigh-Monstevens

[11] Patent Number: 4,708,228

[45] Date of Patent: Nov. 24, 1987

[54] BEARING SUPPORT FOR MOTOR VEHICLE CLUTCH CONTROL APPARATUS

[75] Inventor: Keith V. Leigh-Monstevens, Troy, Mich.

[73] Assignee: Automotive Products plc, Warwickshire, England

[21] Appl. No.: 17,020

[22] Filed: Feb. 20, 1987

Related U.S. Application Data

[63] Continuation of Ser. No. 653,313, Sep. 20, 1984, abandoned, which is a continuation-in-part of Ser. No. 477,161, Mar. 21, 1983, Pat. No. 4,585,108.

[51] Int. Cl.⁴ .................... F16D 25/063; F16D 25/08
[52] U.S. Cl. .............................. 192/85 CA; 192/91 A; 192/98
[58] Field of Search ............. 192/70.13, 85 CA, 88 A, 192/91 A, 98, 110 B

[56] References Cited

U.S. PATENT DOCUMENTS

| | | | |
|---|---|---|---|
| 4,144,957 | 3/1979 | de Gennes | 192/98 |
| 4,456,111 | 6/1984 | Limbacher | 192/85 CA |
| 4,467,904 | 8/1984 | Renaud | 192/98 |
| 4,561,531 | 12/1985 | Young et al. | 192/91 A X |

FOREIGN PATENT DOCUMENTS

| | | | |
|---|---|---|---|
| 2635118 | 2/1977 | Fed. Rep. of Germany | 192/98 |
| 2304829 | 10/1976 | France | 192/98 |
| 571432 | 8/1945 | United Kingdom | 192/91 A |
| 1253965 | 11/1971 | United Kingdom | 192/85 CA |
| 1255002 | 11/1971 | United Kingdom | 192/91 A |
| 1441804 | 7/1976 | United Kingdom | 192/98 |
| 2080472 | 2/1982 | United Kingdom | 192/98 |

*Primary Examiner*—Rodney M. Bonck
*Assistant Examiner*—David A. Testardi
*Attorney, Agent, or Firm*—Krass & Young

[57] ABSTRACT

A carrier for a motor vehicle clutch throw-out bearing, the bearing having a revolving race and a non-revolving race. The carrier is generally in the form of a sleeve slidably disposed on the periphery of a tubular member surrounding the driveshaft from the clutch to the motor vehicle transmission. The sleeve has a flange terminating in a rim in which the bearing is located, and the flange has resiliently deformable abutment members snapping back to their original position after the bearing has been placed within the rim, and having abutment surfaces engaged with the non-revolving race of the bearing such as to hold the bearing within the rim between the abutment surfaces and the flange.

11 Claims, 9 Drawing Figures

U.S. Patent  Nov. 24, 1987  4,708,228
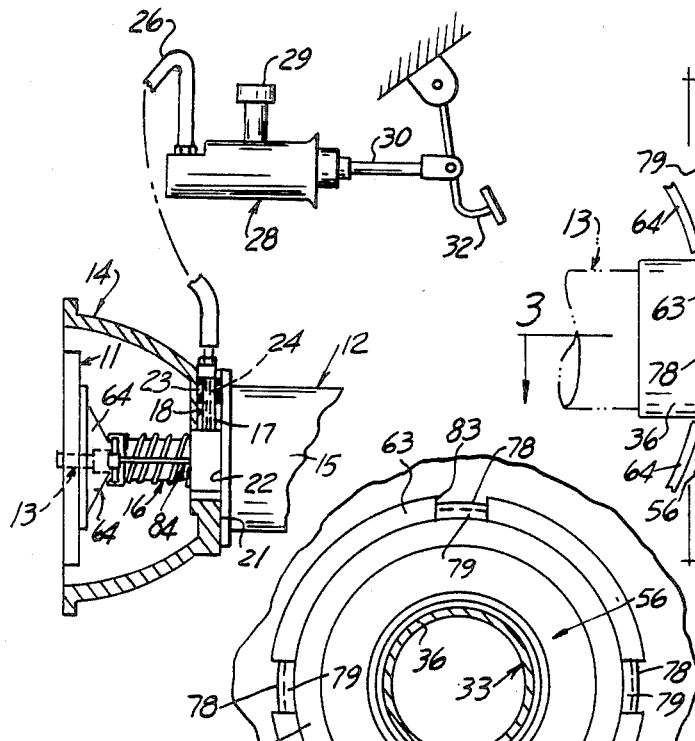
FIG. 1
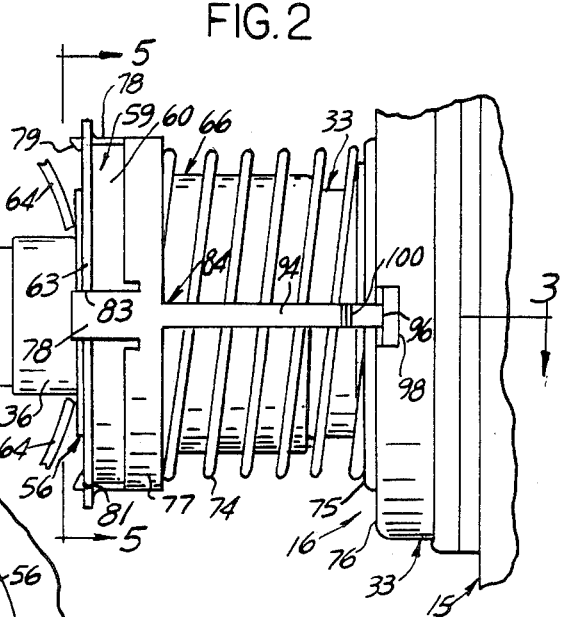
FIG. 2
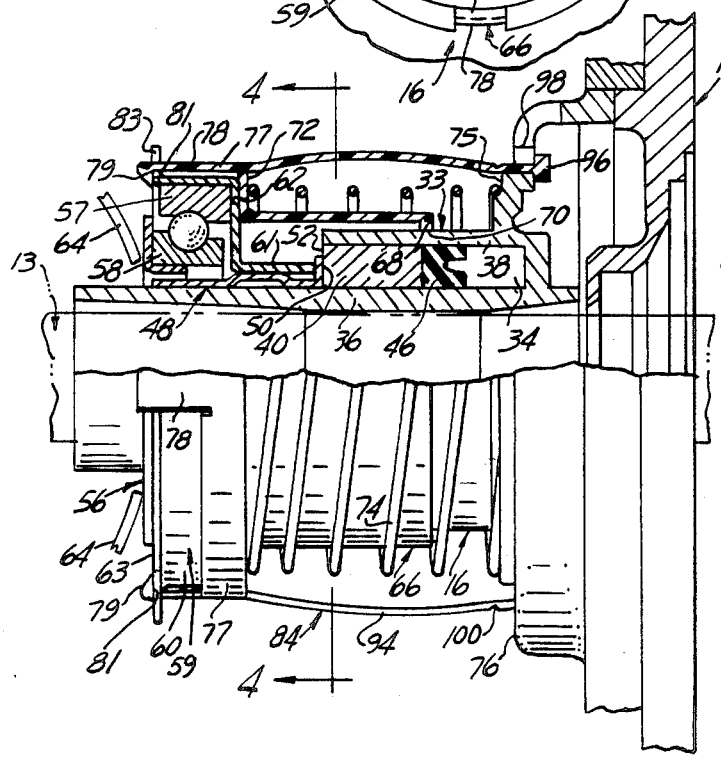
FIG. 3
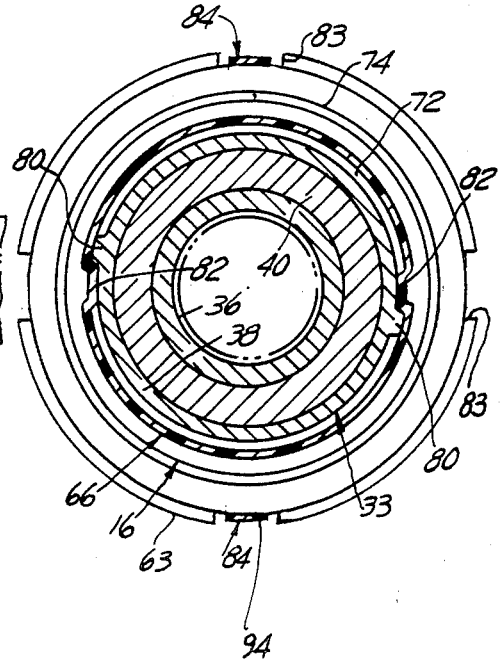
FIG. 4
FIG. 5

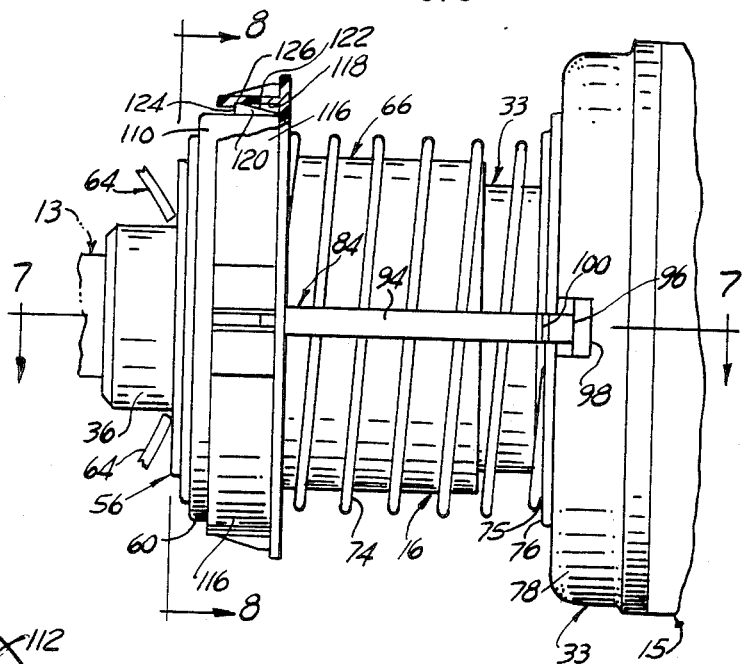
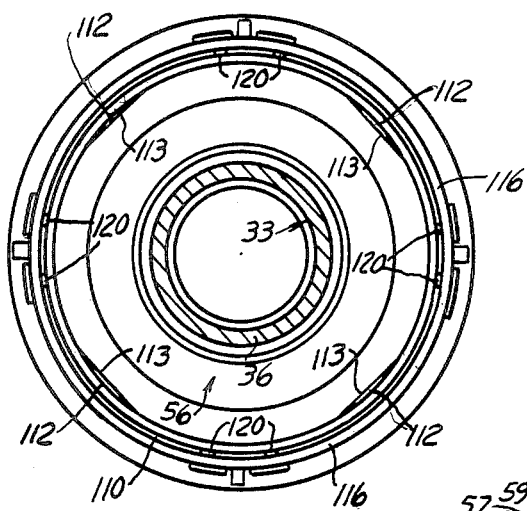
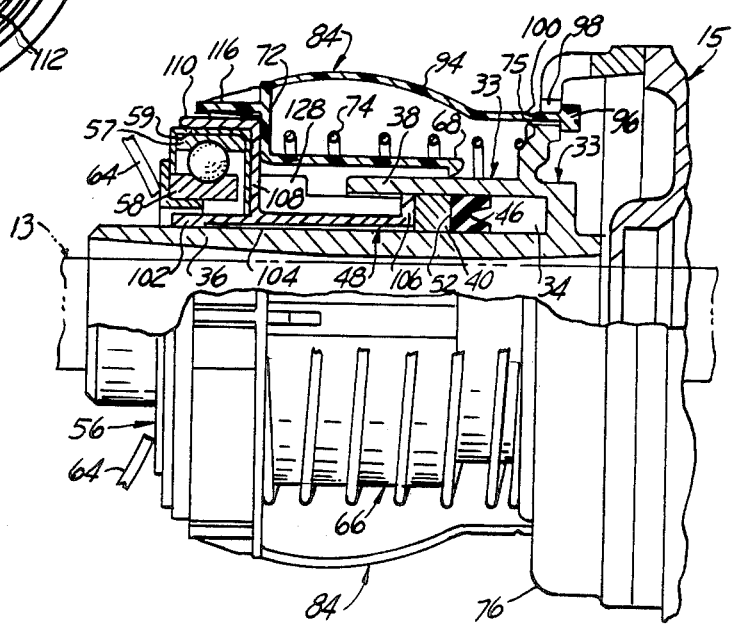

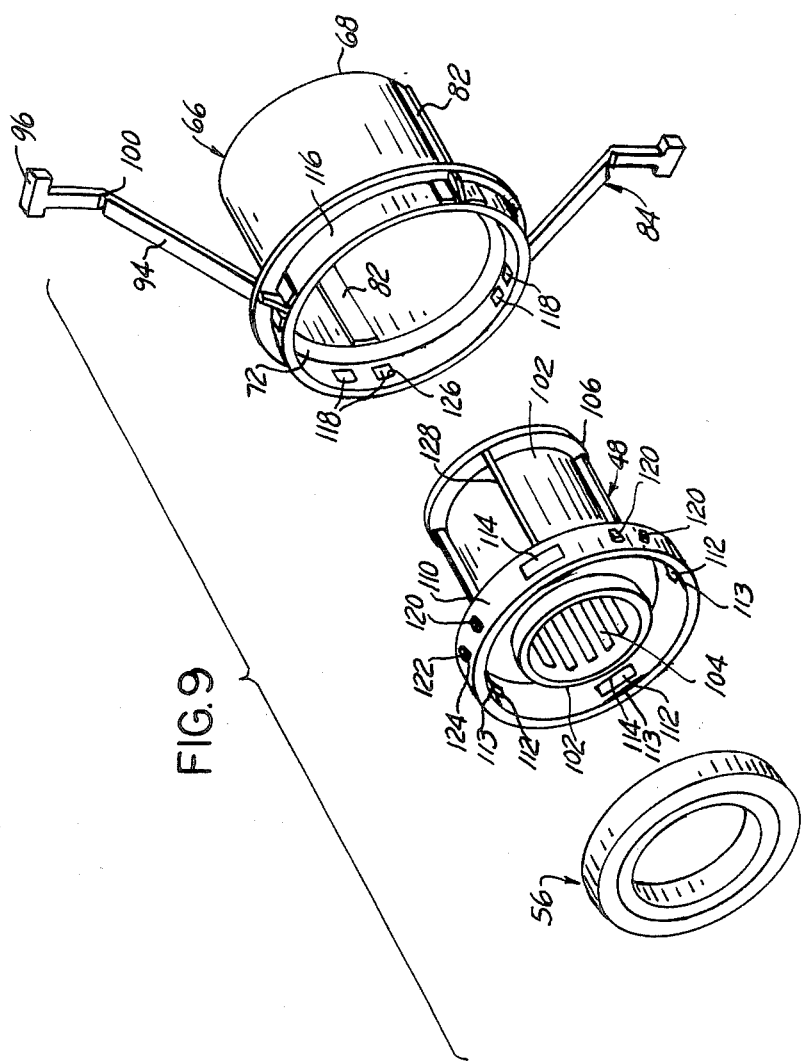

BEARING SUPPORT FOR MOTOR VEHICLE CLUTCH CONTROL APPARATUS

CROSS-REFERENCE TO RELATED APPLICATION

This is a continuation of co-pending application Ser. No. 653,313, filed on Sept. 20, 1984, now abandoned, which is a continuation-in-part of application Ser. No. 477,161, filed on Mar. 21, 1983, now U.S. Pat. No. 4,585,108.

The present application is related to application Ser. Nos. 477,160, 477,162 and 477,159, filed Mar. 21, 1983 now U.S. Pat. Nos. 4,585,107, 4,585,109 and 4,585,106, respectively, and assigned to the same assignee as the present application.

BACKGROUND OF THE INVENTION

The present invention relates to a motor vehicle clutch control mechanism in general, and more particularly to a support member for the clutch release bearing, or throw-out bearing, operated by a hydraulic slave cylinder disposed concentric to the driveshaft coupling the driven member of the friction clutch to the transmission input.

Slave cylinders for hydraulically operating the throw-out, or clutch release, bearing of mechanical diaphragm spring clutches, for example, are bolted to the mounting face of the transmission or gearbox housing, or are bolted or made integral with the clutch bell housing. Improvements to cluch hydraulic slave cylinders, mounted concentric to the driveshaft coupling the driven member of the friction clutch to the transmission inputs are disclosed in the aforesaid patents.

In those patents, structures are disclosed for hydraulic control apparatus for mechanical clutches, adapted to be manufactured and assembled in the form of a complete system comprising a master cylinder, a hydraulic fluid reservoir, and a flexible line interconnecting the master cylinder to the slave cylinder, the hydraulic apparatus being prefilled with hydraulic fluid prior to shipment to a motor vehicle manufacturer for installation on a motor vehicle on the motor vehicle assembly line.

SUMMARY OF THE INVENTION

The principal object of the present invention is to provide a simple and sturdy structure, comprising elements that are easily snapped together during assembly, for supporting and reciprocating the clutch release or throw-out bearing operated by a hydraulic slave cylinder mounted around the driveshaft coupling the driven member of the friction clutch to a motor vehicle transmission or gearbox input.

These and other objects of the present invention will become apparent to those skilled in the art when the following description of the best modes contemplated for practicing the invention is read in conjunction with the accompanying drawing wherein like numerals refer to like or equivalent elements, and in which:

BRIEF DESCRIPTION OF THE DRAWING

FIG. 1 is a schematic representation of a clutch hydraulic control apparatus according to the present invention;

FIG. 2 is a side elevation view of a portion of the slave cylinder;

FIG. 3 is a partial longitudinal section thereof along line 3—3 of FIG. 2;

FIG. 4 is a cross-section thereof on the plane of line 4—4 of FIG. 3;

FIG. 5 is a front elevation view thereof from line 5—5 of FIG. 2;

FIG. 6 is a view similar to FIG. 2 but showing a modification thereof with portions broken away to show a part of the internal structure;

FIG. 7 is a partial longitudinal section from line 7—7 of FIG. 6;

FIG. 8 is a front elevational view thereof from line 8—8 of FIG. 6; and

FIG. 9 is an exploded view of a portion of the structure illustrated at FIGS. 6-8.

DETAILED DESCRIPTION OF THE PREFERRED EMBODIMENTS

Referring to the drawing, and more particularly to FIG. 1, a motor vehicle transmission is schematically illustrated as comprising a friction clutch assembly 11 and a gearbox or transmission 12 enclosed in a casing 15. A driveshaft 13 drives the gearbox 12 from the clutch assembly 11. A bell housing 14, surrounding the clutch assembly 11, is bolted on the rear face of the motor vehicle engine, not shown. The rear face 21 of the bell housing 14 is bolted to the face 22 of the gearbox casing 15. An annular hydraulic slave cylinder 16 is disposed around the driveshaft 13 within the bell housing 14. In the example of structure illustrated, the slave cylinder 16 has a radially outwardly projecting portion or lug 17 which is disposed in a radial groove or channel 18 formed in the rear face 21 of the clutch bell housing 14 attached to the face 22 of the gearbox casing 15, such that the projecting portion or lug 17 is sandwiched between the face 21 of the bell housing 14 and the face 22 of the gearbox housing 15. A generally annular elastomeric collar 23 is placed around the projecting portion or lug 17 such as to securely hold the slave cylinder projecting portion or lug 17 in the groove or channel 18 in the bell housing face 21 and against the face 22 of the gearbox casing 15. A fluid passageway 24 runs the length of the projecting portion or lug 17 into the slave cylinder 16. The passageway 24 is connected via a hydraulic fluid conduit 26 to a master cylinder 28.

The master cylinder is provided with a built-in hydraulic fluid reservoir 29, in the example of structure illustrated, and has an input rod 30 pivotally connected at an end to a clutch control pedal lever 32 installed within the driver compartment of a motor vehicle, not shown. The rod 30, as is well known, is connected to a piston, not shown, disposed in the master cylinder 28 for displacing the hydraulic fluid through the line 26 to the slave cylinder 16 when the clutch pedal lever 32 is depressed. The hydraulic fluid is displaced, through the passageway 24 in the slave cylinder radially projecting portion or lug 17, into the housing 33 of the slave cylinder 16 which is provided with an annular chamber 34, FIG. 3. The annular chamber 34 is formed between two concentric tubular portions 36 and 38 which are cast integral together with the projecting portion of lug 17, for example of cast aluminum in a single piece, in the example of structure illustrated.

An annular piston 14 is reciprocably and slidably disposed in the cylinder housing 33 between the two concentric tubular portions 36 and 38. An elastomeric V-shaped, in section, seal 46 is freely disposed in the annular chamber 34 above the annular piston 40, such as to prevent leakage of fluid from the annular chamber 34 past the piston 40.

A sleeve, or carrier, 48 is slidably disposed around the periphery of the inner tubular portion 36 of the cylinder housing 33. The sleeve 48 has a flanged end portion 50 freely engaged wth the end face 52 of the piston 40. A thrust ball bearing 56 having an outer race 57 and an inner race 58 is mounted in a housing 59 having a tubular rim portion 60 disposed around the bearing outer race 57 and a reduced diameter tubular portion 61 disposed around the sleeve 48. The end of the bearing housing tubular portion 61 is engaged behind the flange end portion 50 of the sleeve 48. An integral flange 62 radially extends between the housing reduced diameter tubular portion 61 surrounding the sleeve 48 and the rim 60 disposed around the periphery of the bearing outer race 57. The edge of the rim 60 terminates in a curved upwardly extending flange 63.

The bearing outer race 57 is non-rotating and its rear face engages the housing flange 62 and, in some structures, the periphery of the bearing outer race 57 is press-fitted within the housing rim 60. In other structures, permitting the bearing 56 to float within the housing 59, means are provided for allowing the bearing outer race 57 to be displaced laterally within the housing 59, an appropriate clearance being provided between the peripheral surface of the outer race 57 and the inner surface of the rim 60, the outer race 57 being prevented from rotating relatively to the housing 59 by way of any convenient arrangements, such as by coupling the rear face of the outer race 57 to the housing flange 62 frictionally or by means of splines and grooves, not shown. The inner race 58 of the throw-out bearing 56 is arranged to engage the end of the clutch release fingers 64 such that when the throw-out bearing 56 is placed to the left from the position indicated at FIG. 3, the clutch 11, FIG. 1, is released.

A dust cover 66 is disposed surrounding the tubular portion 61 of the bearing housing 59 and a portion of the peripheral surface of the outer tubular portion 38 of the cylinder housing 33. The dust cover 66 is generally cylindrical in shape and is molded of plastic such as nylon. One end of the dust cover 66 is formed with an inwardly radially projecting flange or lip 68 having an inner edge 70 in sliding engagement with the peripheral surface of the cylinder outer tubular portion 38. The other end of the dust cover 66 has an outwardly projecting flange portion 72 abutting against the flange 62 of the bearing housing 59. A coil spring 74 is held in compression between the flange portion 72 of the dust cover 66 and an annular abutment 75 formed on a radially outwardly extending flange portion 76 of the cylinder housing 33.

The dust cover 66 has a rim or collar 77 formed integrally at the periphery of the flange portion 72 and partly surrounding the outer rim 60 of the bearing housing 59, FIGS. 2 and 3. A plurality of integral fingers 78 project from the edge of the dust cover rim 77. Each finger 78 is provided at its tip with a hook-like structure consisting of a ramp portion 79 provided inwardly with a radially extending abutment surface 81. The bearing housing 59 is held within the dust cover rim 77 by pressing the bearing housing 59 within the rim 77 of the dust cover 66, the ramps 79 at the tip of the fingers 78 through engagement with the edge between the flange 62 of the bearing housing 59 and the rim 60 causing outward resilient deflection of the fingers 78, until the tips of the fingers are passed through cut-out portions 83 in the curved flange 63 of the housing rim 60, at which time the fingers 78 snap back to their original position causing the tip abutments 81 to engage behind the bottom edge of the cut-out portions 83 in the bearing housing end flange 63. In this manner, the bearing housing 59 is held within the end rim 77 of the dust cover 66 and is prevented from rotating relative to the dust cover 66 as a result of the fingers 78 projecting through the flange cut-out portion 83. The bearing housing 59 is prevented from escaping from within the dust cover rim 77, as a result of the interference provided by the finger tip abutments 81.

As best shown at FIG. 4, the slave cylinder housing 33 has a pair of diametrically arranged outwardly projecting lugs 80 disposed at the end of the outer tubular portion 38 of the slave cylinder housing 33. During assembly of the slave cylinder 16, the lugs 80 are engaged below the dust cover 66 by snapping the edge lip 68 of the dust cover over the outwardly projecting lugs 80. The dust cover 66 is provided with a pair of diametrically disposed longitudinal projections, in the form of inwardly directed U-shaped channels or dimples 82, which limit the permissible rotation of the dust cover 66 relative to the cylinder casing 33 to a maximum of 180° as a result of lateral abutment of the U-channel or dimple sidewall with a side of the lugs 80.

The dust cover 66, in addition to acting as a seal preventing introduction of dirt below the dust cover, acts as a retainer preventing travel of the sleeve 48 and the housing 59 of the throw-out bearing 56, after assembly of the slave cylinder 16, beyond the limits defined by the inner face of the dust cover lip 68 engaging the lugs 80 outwardly projecting from the cylinder housing 33, under the urging action of the compressed coil spring 74. The coil spring 74 is relatively weak and, functionally, operates only to urge the revolving race 58 of the throw-out bearing 56 constantly in engagement with the end of the fingers 64 of the clutch release mechanism, after installation of the slave cylinder 16 in a motor vehicle transmission train.

A restraining strap, designated generally at 84, is provided in some structures for retracting the throw-out bearing 56 to the position shown at FIG. 3, after assembly of the slave cylinder 16, against the action of the compressed coil spring 74. The restraining strap 84 holds the throw-out bearing 56 in a retracted position during filling of the hydraulic system with hydraulic fluid, during shipment to a motor vehicle manufacturer and during assembly of the hydraulic clutch release system on a motor vehicle on the assembly line.

In the example of the structure illustrated, the restraining strap 84 and the dust cover 66 are molded in a single piece. The restraining strap 84 takes the form of a pair of bands or strips 94, FIGS. 2-4, that are integrally molded with and extend from the dust cover rim or collar 77, the free end of each band or strip 94 terminating in an integral strut 96 disposed transversely at right angle to the axis of the band or strip 94 and permitting attaching the end of each band or strip 94 to the slave cylinder housing 33. The slave cylinder housing 33 is provided with a pair of T-slots 98 diametrically disposed on the front face of the housing flange portion 76. Each band or strip 94 of the restraining strap 84 is provided with a weakened portion 100, which may be a portion of reduced thickness as will be the result of forming a V-groove, as shown, on the surface of the band or strip 94, or a portion of reduced width, or both. After installation of the apparatus of the invention in a motor vehicle, and upon first actuation of the slave cylinder 16, hydraulic fluid displaced from the master cylinder 28 to the annular chamber 34 in the slave cylinder housing 33, FIG. 3, causes displacement of the seal 46 and piston 40, and displacement of the throw-out bearing 56 as a result of the coupling between the piston 40 and the throw-out bearing through the sleeve 48 and the bearing housing 59, with the result that the bands or strips 94 are broken at their weakened portion 100, thus releasing the dust cover 66, the bearing carrier 48, and the throw-out bearing 60 for normal operation by the slave cylinder 16.

The structure of the housing 33 of the slave cylinder 16 of FIGS. 6–8 is identical to that of FIGS. 2–5, i.e. the casing 33 is made of a single-piece casting, with integral concentric tubular portions 36 and 38. Motions of the annular piston 40 are transmitted to the throw-out bearing 56 by means of a single-piece molded sleeve or carrier 48 made of plastic, such as nylon for example. The carrier 48 has a tubular body 102, FIG. 7, preferably provided with longitudinal grooves on a portion of its internal surface, as shown at 104, forming lubricant reservoirs and decreasing the internal surface area of the carrier tubular body 102 in sliding engagement with the peripheral surface of the cylinder inner tubular portion 36. The carrier tubular body 102 has, at an end, an outwardly projecting flange 106 of relatively small diameter abutting against the annular outer end face 52 of the piston 40. The throw-out bearing 56 is supported from the carrier 48, at the other end of the carrier tubular body 102, by way of a radially outwardly extending integral flange 108 having a forwardly extending rim 110 in which is nested the housing 59 of the throw-out bearing 56. A plurality of chordal ribs or lips 112, best shown at FIGS. 8 and 9, are integrally formed at the edge of the carrier rim 110, extending generally parallel to, and spaced apart from the flange 108 of the carrier 48 for holding the bearing housing 59 nested within th rim 110 between the chordal lips 112 and the flange 108, the chordal lips 112 having each a ramp 113 to aid in resiliently deflecting the chordal lips 112 outwardly with the bearing housing 59 is pushed into the carrier rim 110. The rim 110 has cut-out portions 114, FIG. 9, for improving the elasticity of the chordal lips 112 resiliently deflected outwardly to enable passage of the bearing housing 59 therebetween into the rim 110.

In the structure of FIGS. 6–9, the dust cover 66 and the restraining strap 84 are also formed integrally of a singlepiece plastic molding. The dust cover 66 is provided at one end with an annular rim or collar 116 adapted to snap over the rim 110 of the carrier 48. For that purpose, the interior surface of the dust cover rim 116 has several pairs, four pairs in the example of structure illustrated, of recesses 118, best shown at FIG. 9, adapted to snap over corresponding projecting lugs 120 molded integral on the peripheral surface of the carrier rim 110. In this manner, the dust cover 66 is coupled to the carrier 48 by disposing the cylindrical body portion 102 of the carrier 48 within the dust cover and pressing the dust cover rim 116 over the carrier rim 110, each of the lugs 120 on the peripheral surface of the carrier rim 112 registering with a recess 118 within the rim 116 of the dust cover 66. The projecting lugs 120 are each provided with a rearward directed ramp portion 122 aiding in progressively deflecting the edge of the dust cover rim 116 outwardly and elastically deflecting inwardly the carrier flange 110 proximate the lugs 120 until each lug 120 snaps into one of the recesses 118 in the interior surface of the dust cover rim 116. Each lug 120 has a frontal abutment 124 engageable with an edge 126, FIG. 6, of each recess 118, such that uncoupling of the dust cover 66 and carrier 48 is prevented. When the dust cover 66 and the carrier 48 are coupled together, the flange 108 of the carrier 48 is in engagement with the flange 72 of the dust cover.

A plurality of longitudinal ribs 128, FIGS. 7 and 9, extending between the carrier flange 106 and 108, on the periphery of the body 102 of the carrier 48, are for the purpose of increasing the rigidity of the carrier and of absorbing most of the load imposed on the body 102 of the carrier during release of the clutch mechanism, when the slave cylinder piston 40 is displaced leftwardly, as seen in FIG. 7, for displacing the throw-out bearing 56 to the clutch release position.

Having thus described the present invention by way of examples of structures thereof given for illustrative purpose only, modifications whereof will be apparent to those skilled in the art, what is claimed as new is as follows:

1. A clutch operating mechanism comprising a carrier member and a throw-out bearing mounted on one end of said carrier member, said throw-out bearing having a non-revolving race held by said carrier member and a revolving race engaged with a clutch mechanism release fingers, said carrier member being disposed slidably over a tubular member surrounding a drive shaft connecting a clutch mechanism to a transmission, said carrier member being in the form of a first sleeve slidably disposed around said tubular member, said first sleeve having an enlarged first end including means for mounting the non-revolving race of said throw-out bearing thereon and a radially outwardly extending circumferential flange, a dust cover member in the form of a second sleeve surrounding said first sleeve, said second sleeve having a rim at one end thereof surrounding said flange of said first sleeve, means attaching said second sleeve to said first sleeve, resiliently deflectable retaining means enabling the non-revolving race of said throw-out bearing to be installed on said first end of said first sleeve by momentarily resiliently deflecting said retaining means during mounting of the non-revolving race of said throw-out bearing on said first end of said first sleeve, said non-revolving race of said throw-out bearing being held by said retaining means on said first end of said first sleeve in abutting relation to said radially outwardly extending circumferential flange.

2. The clutch operating mechanism of claim 1 wherein said resiliently deflectable retaining means comprises at least one chordal lip at the edge of the first end of said first sleeve, said chordal lip being elastically deflected outwardly for allowing the non-revolving race of said throw-out bearing to be pressed within the first end of said first sleeve.

3. The clutch operating mechanism of claim 1 wherein the other end of said first sleeve engages an annular piston disposed in an annular cylinder, said annular cylinder being defined between said tubular member and a second tubular member mounted concentric to said first mentioned tubular member and spaced apart therefrom.

4. The clutch operating mechanism of claim 2 wherein said means attaching said second sleeve to said first sleeve comprises at least one lug projecting from one of said rims and a corresponding recess formed in the other of said rims, said lug having an abutment surface and said recess having an edge whereby said lug abutment surface engages said recess edge after passage of said lug into said recess.

5. The clutch operating mechanism of claim 4 wherein said lug has a ramp for causing resilient deformation of at least one of said rims for enabling said lug to snap into said recess.

6. The clutch operating mechanism of claim 1 wherein said tubular member comprises the inner tubular member of a housing including spaced inner and outer concentric tubular members defining an annular chamber therebetween open at one end thereof and closed at the other end thereof, and wherein the other end of said first sleeve is slidably received in the open end of said chamber and the other end of said second sleeve slidably engages the outer periphery of said outer tubular member of said housing.

7. The clutch operating mechanism of claim 2 wherein the other end of said first sleeve engages an annular piston disposed in an annular cylinder, said annular cylinder being defined between said first mentioned tubular member and a second tubular member mounted concentric to said first mentioned tubular member and spaced apart therefrom.

8. In combination with a hydraulic slave cylinder disposed concentric to a motor vehicle driveshaft from a clutch mechanism to a transmission, said slave cylinder comprising walls formed by a first tubular member disposed concentric to said driveshaft and a second tubular member spaced apart from said first tubular member and disposed concentric to said first tubular member, a clutch throw-out bearing disposed peripherally around said first tubular member, said throw-out bearing having a revolving race and a non-revolving race, and an annular piston reciprocably disposed between the cylinder walls formed by said first and second tubular members, a sleeve slidably disposed around said first tubular member between said throw-out bearing and said annular piston, said sleeve having an end in engagement with said annular piston, a dust cover formed as a third tubular member having a portion in sliding engagement with the peripheral surface of said second tubular member, means attaching said throw-out bearing at one end of said sleeve, and means coupling said sleeve to said dust cover for displacement of said dust cover by said sleeve, wherein said means coupling said sleeve to said dust cover comprises an outwardly extending flange at the other end of said sleeve, said flange terminating in a rim in which said throw-out bearing is disposed, a corresponding flange at an end of said dust cover, said corresponding flange of said dust cover terminating in a rim disposed around the rim of said sleeve, one-way interlocking means attaching the rim of said sleeve and the rim of said dust cover, and wherein said means attaching said throw-out bearing at said one end of said sleeve comprises at least one chordal lip at the edge of the rim of said sleeve, said chordal lip being elastically deflected outwardly for allowing the non-revolving race of said throw-out bearing to be pressed within the rim of said sleeve.

9. The combination of claim 8 wherein said one-way interlocking means comprises at least one lug projecting from one of said rims and a corresponding recess formed in the other of said rims, said lug having an abutment surface and said recess having an edge where the abutment surface of said lug engages the edge of said recess after passage of said lug into said recess.

10. The combination of claim 9 wherein said lug has a ramp for causing resilient deformation of at least one of said rims for enabling said lug to snap into said recess.

11. In combination with a hydraulic slave cylinder disposed concentric to a motor vehicle drive shaft connecting a clutch mechanism to a transmission, said slave cylinder comprising walls formed by a first tubular member disposed concentric to said drive shaft and a second tubular member spaced apart from said first tubular member and disposed concentric to said first tubular member to define an annular chamber therebetween, a clutch throw-out bearing disposed peripherally around said first tubular member, said throw-out bearing having a revolving race and a non-revolving race, a sleeve slidably disposed around said first tubular member between said throw-out bearing and said annular chamber, said sleeve having an end disposed in said annular chamber and another end in engagement with the non-revolving race of said throw-out bearing, a dust cover formed as a third tubular member having a portion in sliding engagement with the peripheral surface of said second tubular member, means attaching said throw-out bearing at said other end of said sleeve, and means coupling said sleeve to said dust cover for displacement of said dust cover by said sleeve, wherein said means coupling said sleeve to said dust cover comprises an outwardly extending flange at said other end of said sleeve against which the non-revolving race of said throw-out bearing is disposed, a corresponding flange at an end of said dust cover in engagement with the flange of said sleeve, the flange at said end of said dust cover terminating in a rim surrounding the flange of said sleeve, and wherein the means attaching the non-revolving race of said throw-out bearing at said other end of said sleeve comprises resiliently deflectable retaining means enabling said non-rotating race to be installed on said other end of said sleeve by momentarily resiliently deflecting said retaining means during mounting of said non-revolving race on said other end of said sleeve, said non-revolving race being held by said retaining means on said other end of said sleeve in abutting relation to said flange of said sleeve.

* * * * *